Oct. 10, 1950 W. A. AYRES ET AL 2,524,747
AIR SPEED INDICATING SYSTEM
Filed Aug. 13, 1943 4 Sheets-Sheet 1
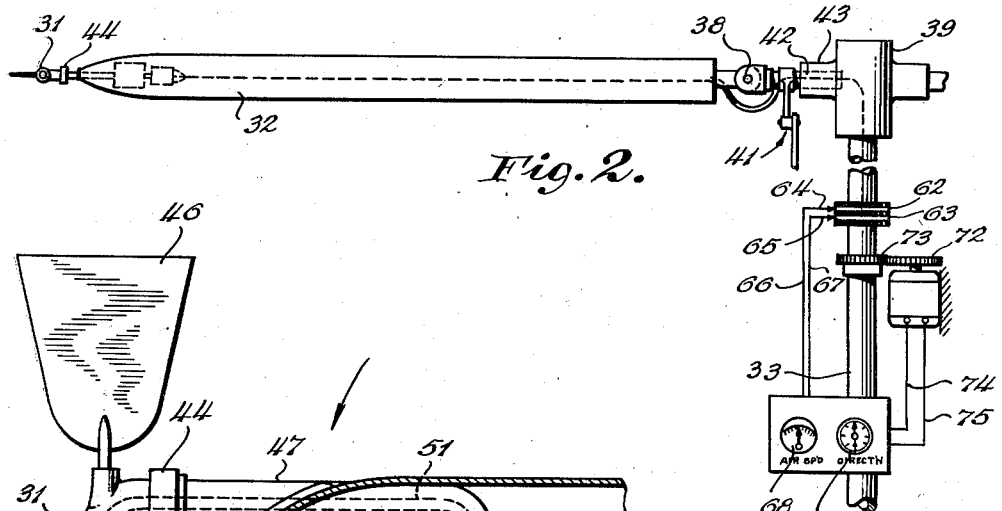
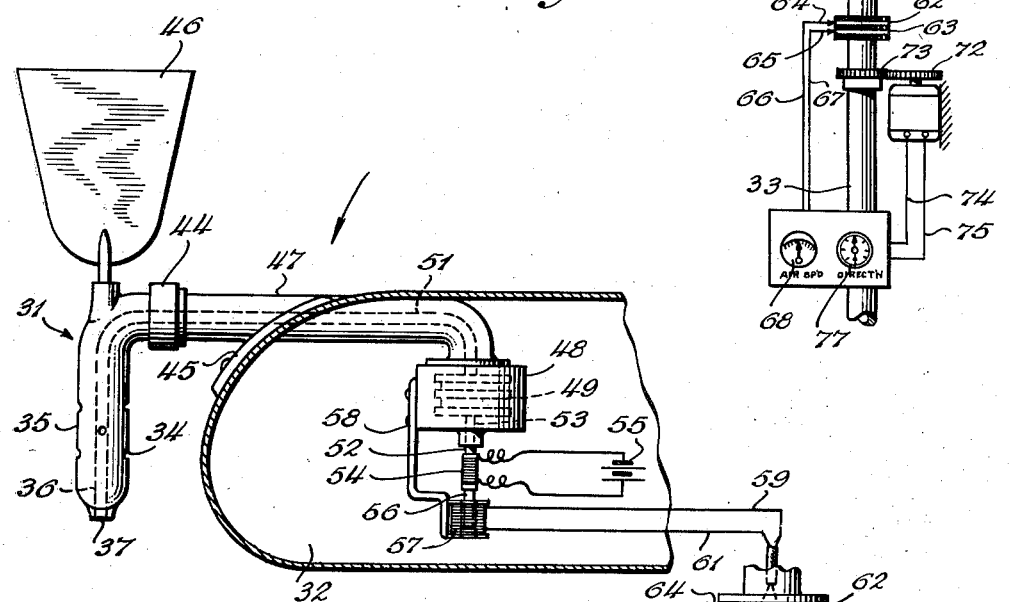
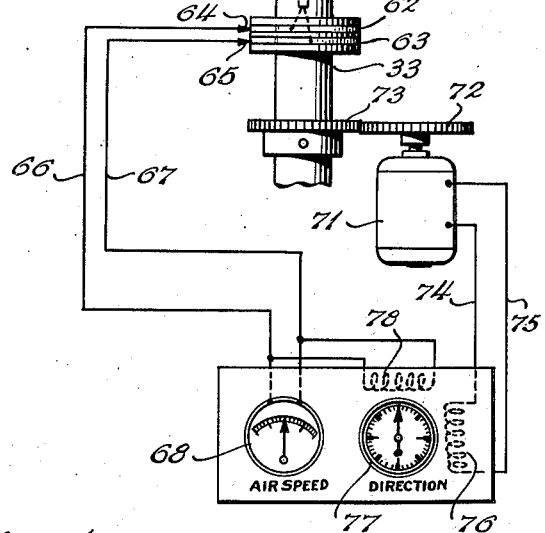
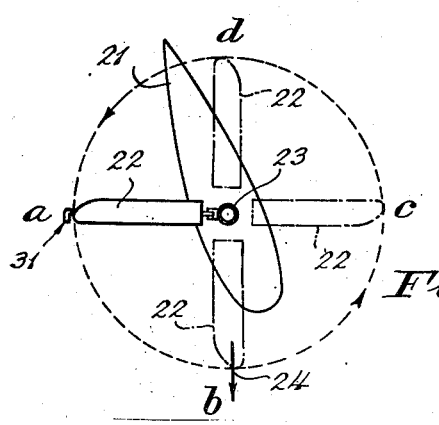
INVENTORS
W. A. AYRES
R. L. WATHEN
G. H. LEE
BY Herbert A. Thompson
then ATTORNEY Oct. 10, 1950  W. A. AYRES ET AL  2,524,747
AIR SPEED INDICATING SYSTEM
Filed Aug. 13, 1943  4 Sheets-Sheet 2
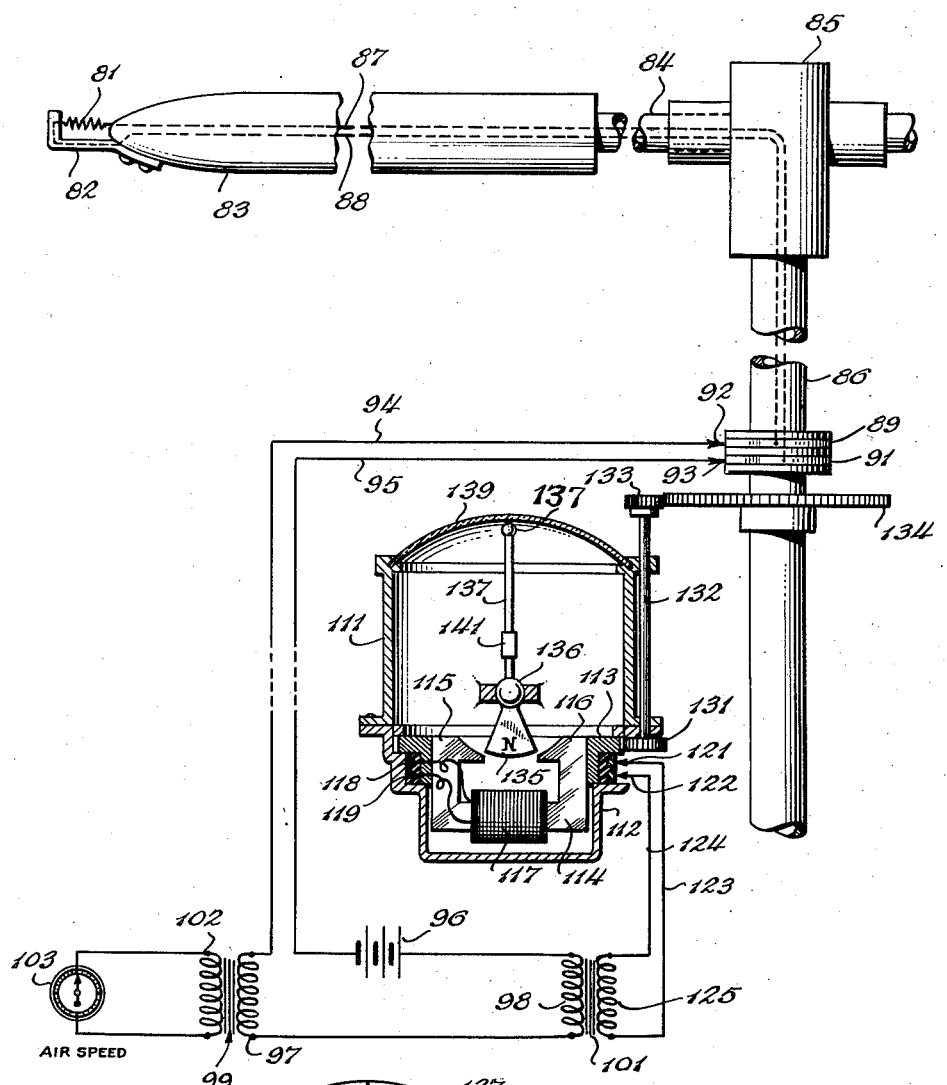
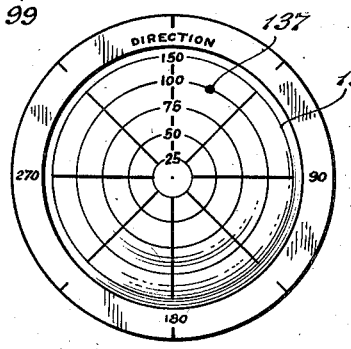
INVENTORS
W. A. AYRES
R. L. WATHEN
BY G. H. LEE
Herbert R. Thompson
their ATTORNEY.

Oct. 10, 1950   W. A. AYRES ET AL   2,524,747
AIR SPEED INDICATING SYSTEM
Filed Aug. 13, 1943   4 Sheets-Sheet 3
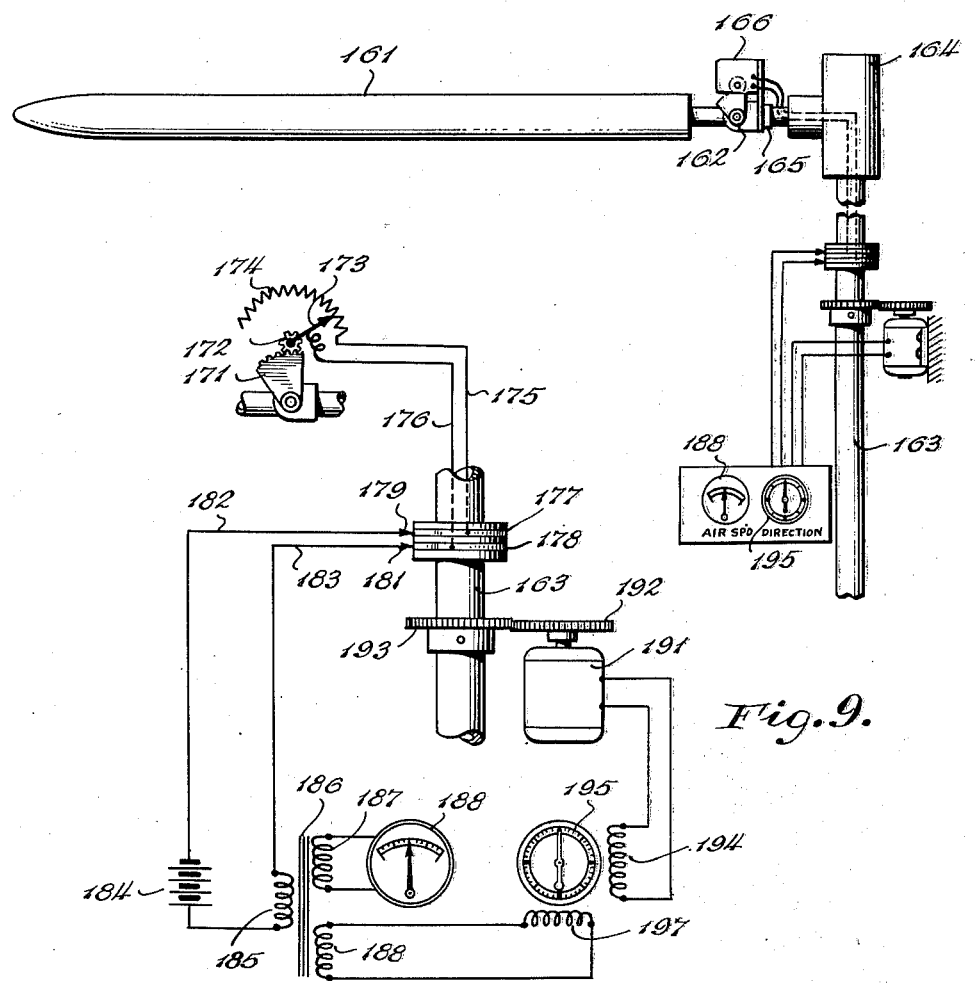
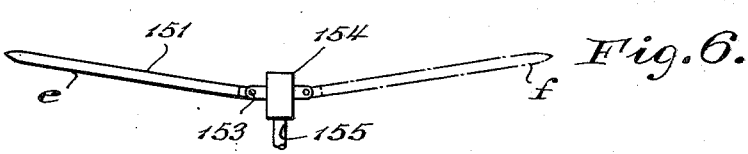
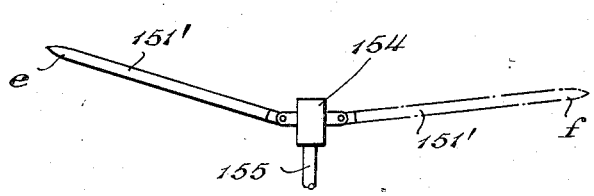
INVENTORS
W. A. AYRES
R. L. WATHEN
G. H. LEE
BY Herbert W. Thompson
ATTORNEY Oct. 10, 1950  W. A. AYRES ET AL  2,524,747
AIR SPEED INDICATING SYSTEM
Filed Aug. 13, 1943  4 Sheets-Sheet 4
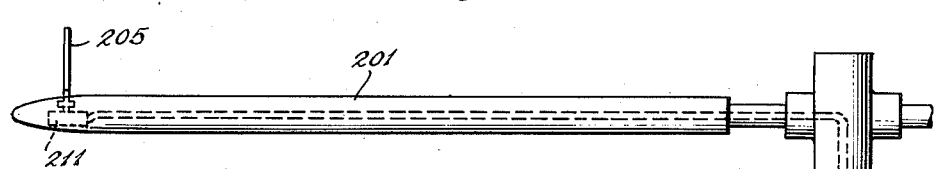
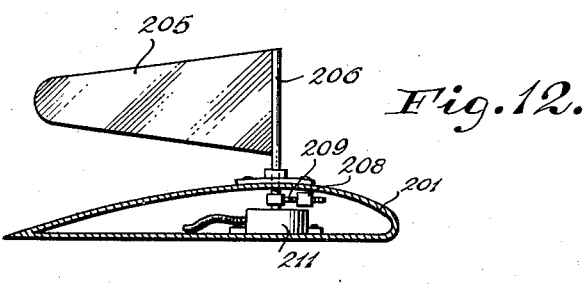
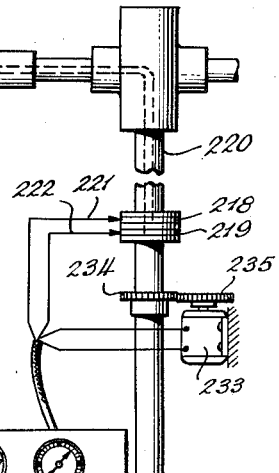
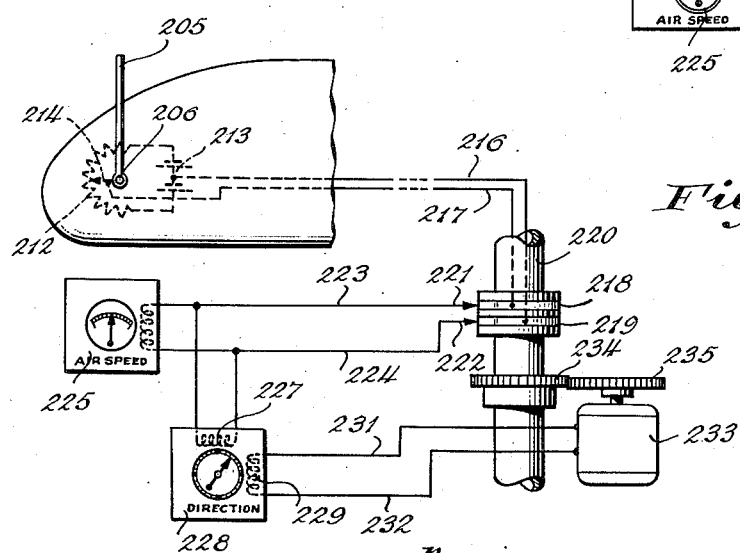
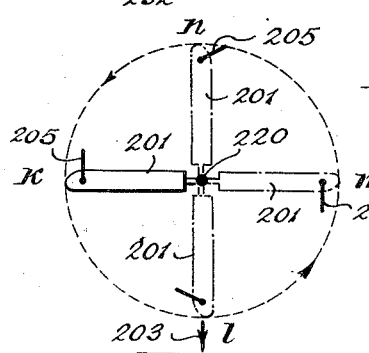
INVENTORS
W. A. AYRES
R. L. WATHEN
G. H. LEE
BY
Herbert H. Thompson
ATTORNEY Patented Oct. 10, 1950

2,524,747

UNITED STATES PATENT OFFICE 2,524,747

AIR SPEED INDICATING SYSTEM

Waldemar A. Ayres, Kew Garden Hills, Robert L. Wathen, Hempstead, and George H. Lee, Garden City, N. Y., assignors to The Sperry Corporation, a corporation of Delaware Application August 13, 1943, Serial No. 498,510

25 Claims. (Cl. 73—178)

This invention relates generally to air speed indicating systems and particularly to air speed indicating systems adaptable to aircraft of the rotating wing type.

Several problems are presented in measuring the air speed of aircraft having rotating wings, in that the rotation of the wings usually creates considerable air turbulence over those portions of the aircraft at which conventional air speed measuring devices would normally be carried. Many experiments have been conducted in an effort to discover some convenient point at which a Pitot tube might be mounted and be free from the effects of air turbulence and other currents generated by the rotary wing. Although some solutions to this problem have been offered, other difficulties have not as yet been overcome.

In some types of rotary wing aircraft, it is possible to reduce the air speed to zero, which is generally referred to as "hovering." It is necessary for the air speed indicating system to accurately measure the air speed of the aircraft from zero to some fairly high speed of the order of several hundred miles per hour. This range has not heretofore been encountered, since aircraft of the fixed wing type necessarily require a minimum sustaining air speed which is usually far above the zero speed possible with some rotating wing aircraft.

A further difficulty is encountered in some types of rotating wing craft because their air speed is not necessarily of the same direction as their heading. In helicopters, for example, it is possible for the aircraft to head in one direction but to move in the opposite direction or to move laterally. Thus, it is desirable for the pilot of a rotating wing aircraft to know the air direction of his craft relative to its longitudinal axis or heading.

It is therefore a major object of the invention to provide an air speed indicating system for accurately measuring the air speed of rotating wing aircraft.

Another object of the invention is to provide an air speed indicating system in which the direction as well as the amount of the air speed is indicated.

A further object of the invention is to provide an air speed indicator for rotating wing aircraft in which the air speed is measured by determining the variations in the air speed of the rotating wing.

A further object of the invention is to provide an air speed indicating system for rotating wing aircraft in which the air speed of the wing is measured and the variable component of said air speed separated to determine the air speed of the aircraft.

A further object of the invention is to provide an air speed indicating system for rotating wing aircraft in which the tipping of the axis of the cone generated by rotation of the wing is measured to determine the air speed of the aircraft.

A further object of the invention is to provide an air speed indicating system for rotating wing aircraft in which variations in the air speed of the rotating wing measured in a direction perpendicular to the radial axis of the wing are used to determine the air speed of the aircraft.

A further object of the invention is to provide an air speed indicating system for rotating wing aircraft in which variations in the air speed of the wing measured along the radial axis thereof are used to determine the air speed of the aircraft.

A still further object of the invention is to provide an air speed indicating system for rotating wing aircraft in which the amplitude and phase of variations in the air speed of the rotating wing are utilized to determine the air speed and direction of the aircraft.

Other objects and advantages of the invention will become apparent from the following specification taken in connection with the accompanying drawings, wherein:

Fig. 1 is a diagrammatic top plan view of a rotating wing type aircraft showing a wing in four different positions to facilitate explanation of the basic principles underlying this invention.

Fig. 2 is an elevation view showing one embodiment of the invention using a conventional Pitot tube to measure the air speed of the rotating wing.

Fig. 3 is a schematic diagram showing the circuits used in the apparatus illustrated in Fig. 2.

Fig. 4 is an elevation view, partially in section, showing a modified form of the invention, including a combined air speed and direction indicator and in which a hot wire type air speed measuring device is used to determine the air speed of the rotating wing.

Fig. 5 is a top plan view of the indicator shown in Fig. 4.

Fig. 6 is a diagrammatic elevation view of a rotating wing showing the wing in two positions when the air speed of the craft is zero.

Fig. 7 is a view similar to that shown in Fig. 6 but showing the same two positions of the rotating wing when the aircraft is moving in a direction perpendicular to the plane of the paper.

Fig. 8 is an elevation view of another form of the invention, in which the phenomena illustrated in Figs. 6 and 7 is used to determine the air speed of the aircraft.

Fig. 9 is a schematic diagram showing the circuits used in the apparatus illustrated in Fig. 8.

Fig. 10 is another diagrammatic top plan view of a rotating wing type aircraft showing a wing in four different positions with a device thereon for measuring changes in air speed along the radial axis of the wing.

Fig. 11 is an elevational view of a further modified form of the invention utilizing a device such as that shown diagrammatically in Fig. 10.

Fig. 12 is a sectional view through the wing showing the arrangement of parts of the air speed measuring system illustrated in Fig. 11.

Fig. 13 is a schematic diagram showing the circuits used in the apparatus illustrated in Fig. 11.

As mentioned above, it is possible for some types of rotating wing aircraft to have an air speed equal to zero, which is referred to as "hovering." In such a case, it will be apparent that the air speed of a rotating wing is constant during an entire revolution, assuming, of course, it is rotated at a constant speed. However, if the aircraft has an air speed in one direction, the air speed of a rotating wing will vary during each revolution. This is due to the fact that during one half of a revolution the speed of the aircraft will be added to the speed of the wing, and during a second half of each revolution the air speed of the aircraft will be subtracted from the speed of the wing.

Referring to Fig. 1, a rotating wing type aircraft 21 has a wing 22 that is carried and rotated by a vertical shaft 23. Of course, conventional rotating wing aircraft have at least one other wing arranged on the opposite side of the shaft 23. Any number of wings may be employed without departing from the present invention.

Assuming the aircraft 21 shown in Fig. 1 has an air speed in the direction of arrow 24 and the blade 22 is rotating in a counterclockwise direction, the air speed of the wing 22 in a position designated $a$ will be larger than the air speed of rotating wing 22 shown in dotted position $c$, since the velocity or air speed of the craft 21 will add to the rotational speed of the wing 22 at the point $a$ but will subtract from the rotational speed of the wing 22 at the point C. Similarly, the air speed or velocity of the aircraft 21 will have no effect upon the rotational air speed of the wing 22 in dotted positions $b$ and $d$, since the wings are then aligned with the direction of the air speed as represented by arrow 24.

Let us assume that the air speed of the wing 22 at positions $b$ and $d$ is assumed to be the normal air speed of the wing 22. Actually, this speed will be approximately the same speed as the wing would have if the air craft were hovering. In moving from position $d$ to position $a$, the air speed increases to a maximum, then decreases as the wing proceeds to position $b$ where it is again at the normal value. In moving from position $b$ to position $c$, the air speed is decreasing to a minimum and then rises as it approaches position $d$ and its normal value.

From this description, it will be apparent that the air speed of the wing varies substantially sinusoidally above and below a normal speed and that the amplitude of this sinusoidal variation is dependent upon the air speed of the craft 21. Furthermore, the direction of the air speed relative to the heading of the aircraft 21 determines the phase relationship of the sinusoidal variation in air speed of the wing to the revolution of the shaft 23. These principles form the basis for the present invention, as will become apparent from the following description of specific embodiments thereof.

Figs. 2 and 3 of the drawings show an air speed indicating system which employs a conventional Pitot tube and flexible bellows for comparing dynamic and static pressures at the wing tip to determine the air speed of the wing. The Pitot tube, designated generally at 31, is carried at the end of rotating wing 32 so it is substantially free from air turbulence created by rotation of the wings about the axis of driving shaft 33. The Pitot tube 31 may be of conventional construction having static pressure orifices 34 formed in a cylindrical member 35 surrounding dynamic pressure tube 36. Dynamic orifice 37 in the tube 36 is arranged to measure dynamic pressure perpendicular to the radial axis of the wing.

The rotating wing 32 is pivoted as at 38 for movement about a horizontal axis relative to the driving shaft 33. The wing is supported by a hub assembly 39 on the end of a shaft 33. The hub assembly may include suitable mechanism such as that shown at 41 for controlling the pitch, that is, the angle of attack of the wing 32. Since the wing is rotatable about its radial axis by the fitting of stub shaft 42 in the journal 43, the Pitot tube 31 is connected by a rotatable joint 44 to a bracket 45. A suitable vane 46 may be mounted at the rear of the Pitot tube in order to keep the dynamic orifice 37 constantly directed into the wind, although the pitch of the wing 32 is varied.

Static pressure is conducted by outer tubing 47 to a static chamber 48 carried within the wing 32. A bellows 49 within the chamber 48 is connected to the dynamic orifice 37 by an internal tube 51 in a conventional manner, whereby the bellows acts to compare the dynamic and static pressures which provides a measure of the air speed at the dynamic orifice 37. The bellows 49 expands and contracts as the air speed increases and diminishes. This expansion and contraction of the bellows 49 may be conveyed to a suitable meter within the aircraft by converting the mechanical movement of the bellows into an electric signal. One way of accomplishing this is by connecting the bellows 49 to actuate a conventional signal generator. However, since it is only necessary to determine variations in the air speed of the wing 32 in order to measure the air speed of the aircraft, it is only necessary to convert changes in the position of the bellows into an electrical signal.

As shown most clearly in Fig. 3, this transformation is readily accomplished by connecting an electromagnet 52 to the bellows 49 as by a rod 53. The magnet 52 has a coil 54 wound thereon and connected to a suitable source of energy such as a battery 55. The battery may be carried within the wing or, if desired, connected through suitable slip-rings on the shaft 33 to another source of supply within the body of the aircraft. The current in the coil 54, due to the potential of the battery 55, produces a constant magnetic flux in the core 52 and also in a projecting portion 56 which is slidable within a fixed coil 57 carried by a bracket 58 on the chamber 48.

As the bellows 49 expands and contracts, because of variations in the air speed at the dynamic orifice 37, the projecting core portion 56 moves relative to the coil 57, whereby the magnetic flux of the core induces a voltage in the coil 57 dependent upon the amplitude of the variations in air speed. This signal is an alternating voltage signal which is transmitted by leads 59 and 61 to slip-rings 62 and 63 on the shaft 33. Suitable brushes 64 and 65 engage the slip-rings 62 and 63 and are connected by leads 66 and 67 to an alternating current voltmeter 68 which may be of any conventional type.

Since the amplitude of the alternating voltage signals induced in coil 57 depends upon the amplitude of the variation of the air speed at the dynamic orifice 37, the amplitude of the signals, as measured by the alternating current voltmeter 68, corresponds to the air speed of the aircraft, assuming the rotor speed to remain substantially constant which is usually the case in well designed helicopters.

As has been previously explained, the air speed of the aircraft 21 in any direction causes the air speed of a rotating wing to vary sinusoidally during each revolution. The amplitude of this variation depends upon the air speed of the aircraft. Therefore the alternating current voltmeter 68 may be calibrated in the terms of air speed for the normal speed of rotation of the rotor blades so the air speed may be read directly by an observer.

As has previously been explained the variations in air speed during a revolution have a definite phase relation with the air direction of the aircraft. For purposes of description the air direction may be defined as the direction of the aircraft's air speed relative to its heading, that is, relative to its longitudinal axis. The maximum and minimum air speeds measured by the Pitot tube 31 occur at diametrically opposed points arranged on a line perpendicular to the air direction of the aircraft. When the air direction of the aircraft is the same as the direction of its heading, a line connecting the points of maximum and minimum air speeds is perpendicular to the longitudinal axis of the aircraft. When the air direction is other than the direction of the aircraft's heading, the maximum and minimum air speeds continue to occur at diametrically opposed points, but the points no longer lie on a line perpendicular to the longitudinal axis of the aircraft.

It will be seen therefore that the alternating voltage signal has a definite phase relationship as compared with the revolution of the rotating wing to the air direction of the aircraft. Since the voltage induced in the coil 57 depends upon the rate of movement of the core 52, there will be a phase shift of approximately ninety degrees between the variations in air speed as measured by the Pitot tube 31 and the voltage signals produced by coil 57. However, the amplitude and phase of the voltage signal continue to have a specific relation to the air speed and direction of the aircraft, respectively.

An indication of the air direction may be obtained by comparing the phase of the alternating voltage signal, induced in coil 57, with a signal having a fixed phase relationship to the revolution of the shaft 33.

A signal having a fixed phase relation to the rotating wing is produced by an alternating voltage generator 71, that is driven by suitable gears 72 and 73 from the shaft 33. Output leads 74 and 75 of the generator are connected to one winding 76 of a phase meter 77. Another winding 78 of the phase meter 77 is connected across the leads 66 and 67. The winding 76 is thereby energized by an alternating voltage signal having a fixed relationship with the shaft 33, whereas, the winding 78 is connected to an alternating voltage signal variable in phase according to the air direction of the aircraft.

The two windings 76 and 78 of the phase meter 77 react in a well known manner to position a pointer according to the phase relationship of the voltages applied to the two windings. By appropriately calibrating the dial of phase meter 77 the pointer thereof may indicate the air direction of the aircraft relative to its longitudinal axis. As the phase varies in one direction or another, the pointer will be moved accordingly to indicate the change in the air direction of the aircraft.

From the foregoing description it will be apparent that Pitot tube 31 is used to measure the air speed of the rotating wing 32 in a direction perpendicular to its radial axis. Variations in this air speed produce signals, the amplitude of which is used to determine the air speed of the aircraft. The phase relationship of the signals, as compared to the revolution of shaft 33, is used to determine the air direction of the aircraft.

The Pitot tube disclosed in the drawings is of a conventional type and it is contemplated that other air speed measuring devices may be substituted therefor. Also the particular design of the signal generator for producing signals corresponding to variations in the air speed, as measured by the Pitot tube, may be changed in accordance with requirements of particular installations.

A modified form of air speed indicating system, is shown in Fig. 4. This system is similar to that shown in Figs. 2 and 3, but utilizes a hot wire anemometer for measuring the air speed of the rotating wing.

A hot wire element 81 is carried by bracket 82 at the end of a rotating wing 83, that is mounted by stub shaft 84 in hub assembly 85 of a shaft 86. The hot wire element 81 is of conventional structure in which the resistance within the element varies directly or inversely with its temperature, which, in turn, varies inversely with the velocity of flow of air over it. In this case the element 81 is so arranged that changes in pitch of wing 83 about its radial axis do not affect the response of the element to the air flow. Thus, the element 81 responds to air flow perpendicular to the radial axis of the wing 83 regardless of its pitch.

The ends of the hot wire element 81 are connected by leads 87 and 88 to slip-rings 89 and 91 mounted on the driving shaft 86. Suitable brushes 92 and 93 engage the slip-rings and are connected by leads 94 and 95 into a series circuit including a source of potential such as battery 96 and primary windings 97 and 98 of a pair of transformers 99 and 101, respectively. The voltage of battery 96 is thus applied across the hot wire element 81 causing current to flow through the circuit including the windings 97 and 98.

Variations in the air speed of the wing cause variations n the air flow over hot wire element 81, which in turn cause variations in the resistance of the element. The variations in the resistance of the hot wire element produce an alternating component in the current in the above-mentioned series circuit. This alternating component in the current in the primary winding 97 of the transformer 99 induces a corresponding alternating voltage in secondary winding 102 which may be measured by voltmeter 103. Since the amplitude of the varying voltage depends upon the amplitude of variations in the airspeed of the wing 83, mean voltage measured by the meter 103 may be used to measure the air speed of the aircraft. This form of our invention, as well as those forms hereinafter described, are substantially independent of variations in rotor speed, since while the frequency of the voltage developed will vary with rotor speed, the mean effective voltage (or mean amplitude) will be responsive only to air speed.

Voltmeter 103 may be calibrated in terms of air speed so an observer may read the air speed of the aircraft directly from the scale of the meter. If desired the phase of this voltage may also be compared with a signal having a fixed phase relationship of the revolution of the shaft 86 by a suitable phase meter to determine the air direction of the aircraft.

It is desirable, however, in some cases, to have both the air speed and air direction indicated by the same instrument. One form of an instrument suitable for this purpose is shown in Fig. 4 and the top plan view of the dial appears in Fig. 5. This instrument is composed of a housing 111 having a bottom portion 112 rotatably supporting an external ring gear 113 which carries an electromagnet 114 having diametrically opposed poles 115 and 116 on opposite sides of the center of rotation of the magnet and ring gear. A coil 117 of the electromagnet is connected to slip-rings 118 and 119 by suitable leads. Brushes 121 and 122 engage the slip-rings 118 and 119 and are connected by leads 123 and 124 to a secondary winding 125 of the transformer 101.

It will be apparent that the voltage induced in secondary winding 125 is similar to that induced in secondary winding 102 of the transformer 99. This voltage will cause an alternating current to flow in the coil 117 thereby producing an alternating magnetic flux between poles 115 and 116 having a frequency dependent upon the rotation frequency of the wing, since the air speed varies through one complete cycle during each revolution. However, the ring gear 113 is driven by a pinion 131 on a shaft 132 that is driven by a gear 133 meshing with pinion 134 on the shaft 86. Thus, the electromagnet 114 is rotated synchronously with the shaft 86 and wing 83. Since the flux of the magnet varies at the same frequency as the rotation frequency it will be apparent that maximum and minimum flux occurs at the same points during each revolution. This results in polarized armature 135 being attracted by one of the poles and repelled by the other in a direction dependent upon the phase relation of the signal variations produced by the hot wire element 81 as compared with the revolution of the wing 83. If the magnet is properly positioned, the direction of movement of the armature 135 may correspond to the air direction of the aircraft. In order to provide universal movement for the armature, it is mounted and supported by a suitable ball-joint 136. An indication of the air direction of the aircraft is then produced by a pointer 137 attached to the armature 135.

The armature 135 is moved in a direction corresponding to the air direction of the aircraft and is moved an amount depending upon the amplitude of the signal variations produced by the hot wire element 81. This amplitude corresponds to the air speed of the aircraft, hence the pointer is displaced an amount corresponding to the air speed.

A top plan view of the instrument is shown in Fig. 5 wherein concentric circles on face 139 of the instrument provide a scale for indicating the air speed of the aircraft. The air direction of the aircraft is indicated by the direction in which the pointer 137 moves from the center of the face 139. In order to accurately balance the pointer 137 an adjustable counterweight 141 may be mounted thereon so the pointer will be sufficiently pendulous to return to its central position.

In some instances it may not be practical to mount an air speed measuring device on the wing of the aircraft. In such cases a modified form of the invention, such as shown in Figs. 8 and 9, may be used. This modification utilizes the structure of most rotating wing aircraft in pivoting the wing for movement relative to a plane perpendicular to its axis of rotation. As the wing rotates during motion of the aircraft the air speed of the aircraft causes the lift of the rotating wing in one position to be greater than that in diametrically opposite position. If the wing is not pivoted this increased lift will tend to tip the craft.

When the wing is pivoted it assumes an equilibrium position depending upon the relative amount of the centrifugal and lift forces acting thereon. Fig. 6 shows a rotating wing 151 pivotally mounted as at 153 to hub 154 on supporting shaft 155. The wing rotates about the axis of the supporting shaft 155 and is free to move about the axis of pivot 153. If the aircraft is "hovering," that is, if the aircraft has zero air speed, the wing 151 will remain in the same position relative to a plane perpendicular to the shaft of axis 155. Thus, the wing in position e has the same angular position relative to a plane perpendicular to the axis of rotation as it does in dotted position f. However, if the aircraft is moving in a line perpendicular to the plane of the paper, the air speed of the wing is increased on one side of axis of rotation and decreased on the other. This causes the lift of the wing 151', as shown in Fig. 7, in position e to be greater than its lift in dotted position f. This results in the wing 151' changing its angular position relative to a plane perpendicular to the axis of rotation during each revolution. The position which the wing assumes depends upon its angular velocity and radius which determine the constant centrifugal and air speed forces acting on it, and also upon the air speed of the aircraft which determines the variable lift force.

Since the variable component of the lift force acting upon the rotating wing depends upon the air speed of the aircraft, it is possible to measure the air speed of the aircraft by measuring variations in the angular position of the wing during its rotation.

As the wing rotates it generates a cone having its apex at the shaft 155. When the aircraft is "hovering" the axis of the generated cone is coincident with the shaft 155. However, when the air speed of the aircraft goes above zero, the axis of the generated cone tips to one side due to the changes in the angular position of the wing as it rotates.

Therefore, it will be apparent that air speed may be measured by measuring the angle through which the axis of the cone tips, that is, by measuring the angle by which the wing deviates above and below its normal position during a revolution. Furthermore, the direction in which the axis of the cone tips may be used to determine the air direction of the aircraft. In this modification of the invention, the position of the wing itself is used to determine the variation in its air speed.

As shown in Fig. 8, a wing 161 is tally mounted at 162 for movement relative to a plane perpendicular to the axis of rotation. The axis of rotation is coincident with the axis of supporting shaft 163 having a hub assembly 164 carrying a stub shaft 165 that supports the pivotal joint 162 and the wing 161. The position of the wing 161, relative to that plane is measured by a suitable signal generator 166, which, in the present case, is disclosed as a variable resistor that is actuated (as shown in Fig. 9) by a gear 171, meshing with a gear 172 which rotates slider 173 across winding 174 of the variable resistor. The slider and one end of the variable resistor are connected by leads 175 and 176, to slip-rings 177 and 178 on shaft 163. Brushes 179 and 181 engage the slip-rings and are connected by leads 182 and 183 in a series circuit including a source such as potential battery 184 and primary winding 185 of a transformer 186.

As variations in air speed of the wing 161 cause changes in its position relative to a plane perpendicular to the axis of rotation, the cone generated by the wing is tipped to one side and the variable resistor 174 produces signals corresponding to the air speed variations of the wing. These signals, in the present case, take the form of a varying current which passes through the primary winding 185 of a transformer 186. This current in the primary winding 185 induces varying voltages in secondary windings 187 and 188 of the transformer 186.

The secondary winding 187 is connected to an alternating current voltmeter 188 which acts as an air speed indicator since it measures the amplitude of the voltage applied to it. As in previous cases the amplitude of the voltage signals correspond to the variations of the air speed wing 161 which depends upon the air speed of the aircraft.

An indication of the air direction of the aircraft may be obtained by comparing the phase of the signals produced by the variable resistor 174 with the revolution of the supporting shaft 163. For this purpose a generator 191 is rotated by a gear 192 meshing with pinion 193 on the shaft 163 and produces a signal having a fixed phase relationship with the revolution of the shaft 163 and the wing 161. The generator is connected to one winding 194 of a phase meter 195. A secondary winding 197 of the phase meter 195 is connected to secondary winding 188 whereby the voltage applied to the second winding 197 corresponds to the varying signals produced by the variable resistor 174.

The phase meter acts as an air direction indicator by comparing the signal generated by variations in air speed of the wing 161 with the phase of the reference signal from generator 191. The air speed indicator 188 and air direction indicator 195 must, of course, be suitably calibrated to provide accurate measure of the air speed and direction. In this modification of the invention, the amplitude and phase relation of air speed variations of the wing 161 are measured according to changes in the axis of the cone generated by the wing, due to movements of the wing relative to a plane perpendicular to the axis of rotation.

A still further modified and simpler form of the invention is illustrated in Figs. 10 to 13 inclusive. Referring first to Fig. 10, the rotating wing 201 of an aircraft is shown in four positions, $k$, $l$, $m$, $n$. In the previous forms of the invention various devices are used to determine the variations in the air speed of the wing as measured in a direction perpendicular to the radial axis of the wing. In the modification now being described air speed variations are measured along the radial axis of the wing to determine the air speed of the aircraft as well as its air direction.

If the aircraft supporting the rotating wing, shown in Fig. 10, is moving in a direction corresponding to arrow 203, the air speed measured along the radial axis of the wing 201 will be a maximum in one direction when the wing is in position $l$ and will be a maximum in the opposite direction when the wing is in position $n$. The air speed along the radial axis of the wing will be zero when it is in positions $k$ and $m$. Therefore, as the wing rotates the air speed measured along its radial axis varies sinusoidally, and the amplitude of these variations depends upon the air speed of the aircraft. Furthermore, the phase relation of the variations in air speed may be compared with the revolution of the wing to determine the air direction of the aircraft.

In carrying out this form of the invention any suitable device may be carried by the wing 201 to measure the air speed along its radial axis. As shown in the drawing a vane 205 is carried by a shaft 206 rotatably supported on the upper surface of the wing 201. In order to compensate for the effects of centrifugal force on the vane 205 a counterweight 208 adjustable on a rod 209 is also mounted on the shaft 206 but may be arranged within the wing 201 in order to avoid undesired effects of air currents.

As shown in Fig. 10, the vane swings about the axis of the shaft 206 as the wing 201 rotates. The amplitude of the oscillation of the vane depends upon the air speed of the aircraft. The phase relation of these oscillations depends upon the air direction of the aircraft.

Shaft 206 controls a suitable signal generator 211, which may be of any suitable type, to produce signals corresponding to the variations in air speed along the radial axis of wing 201 as determined by the oscillation of vane 205 during each rotation of the wing. As shown in the drawings, the signal generator 211 consists of a potentiometer 212 energized from a suitable voltage source such as battery 213. Slider 214 on the potentiometer is adjusted by shaft 206 in accordance with the position of the vane 205. The slider 214 and the midpoint of the battery are connected by leads 216 and 217 to slip-rings 218 and 219 on supporting shaft 220. Brushes 221 and 222 engage the slip-rings 218 and 219 and are connected by leads 223 and 224 to a voltmeter 225 which is calibrated as an air speed indicator.

If the slider 214 of the potentiometer is positioned at the center point of the potentiometer when the air speed along the radial axis of the wing 201 is zero, the voltage between the potentiometer slider 214 and the midpoint of the battery 213, that is, the voltage across leads 216 and 217, will at all times correspond in magnitude and direction to the air speed along the radial axis of the wing. Thus, an alternating current or variable voltage will be produced corresponding to the variations in air speed of the wing as measured along its radial axis. The amplitude or magnitude of the alternating voltage is measured by voltmeter 225 having its scale calibrated so that the air speed of the aircraft is indicated on its dial. This form of the invention is, therefore, also substantially independent of the speed of rotation of the helicopter rotor. The leads 223 and 224 are also connected to one winding 227 of a phase meter 228 having its other winding 229 connected by leads 231 and 232 to a generator 233. The generator 233 is driven by suitable gears 234 and 235, synchronously with rotation of the shaft 220, to produce a signal having a fixed phase relationship therewith. A phase meter 228 compares the phase of the signal corresponding to variations in the air speed of the wing 201 with the phase of the signals of generator 203 to determine the air direction of the aircraft.

In each of the modifications of the invention described herein, signals have been produced corresponding to variations in the air speed of a rotating wing. The amplitude of these signals has been used to determine the air speed of the aircraft. The phase relation of these signals to the revolution of the wing has been used to determine the air direction of the aircraft. Some of the elements in the circuits described may be of a non-linear nature as for example the hot wire element shown in Fig. 4. Such non-linear effects as are produced in the circuits may be easily compensated by appropriate calibration of the meters used.

In order to avoid effects of wind gusts and other transient forces, the meters used in the system may be provided with necessary damping in any known manner to eliminate transient effects. Although each embodiment of the invention discloses both air speed and air direction indicators, they may be used individually without departing from the invention.

While the embodiments of the invention illustrated and described measure the air speed of only one rotating wing, it will be obvious that corresponding elements could be placed on as many wings as desired and their combined outputs used to provide similar indications to those described herein. It is contemplated that the present invention may be used on all types of aircraft having a rotating wing.

As many changes could be made in the above construction and many apparently widely different embodiments of this invention could be made without departing from the scope thereof, it is intended that all matter contained in the above description or shown in the accompanying drawings shall be interposed as illustrative and not in a limiting sense.

What is claimed is:

1. The method of determining the air speed of an aircraft having a wing rotating at a substantially constant angular speed which comprises the steps of continuously determining the air speed of said rotating wing in its plane of rotation, segregating variable components from constant components of the determined air speed, and measuring the magnitude of said variable components to determine the air speed of said aircraft in a direction parallel to said plane of rotation.

2. The method of determining the air speed and direction of an aircraft having a wing rotating at a substantially constant angular speed which comprises the steps of continuously determining the air speed of said rotating wing in its plane of rotation, segregating variable components from constant components of the determined air speed of said rotating wing, measuring the amplitude of said variable components to determine the air speed of said aircraft in a direction parallel to said plane of rotation, and comparing the phase relation of said variable components with revolution of said rotating wing to determine the air direction of said aircraft.

3. The method of determining the air speed and direction of an aircraft having a rotating wing which comprises the steps of measuring the magnitude of variations in the angular position of the longitudinal axis of said rotating wing with respect to its axis of rotation to determine the air speed of said aircraft in a direction parallel to the plane of rotation of said rotating wing, and comparing the phase relation of said variations with the revolution of said wing to determine the air direction of said aircraft.

4. The method of determining the air speed and direction of an aircraft having a rotating wing which comprises the steps of measuring the angular position of the axis of the cone generated by said rotating wing, and utilizing the magnitude and direction of said angular position to determine the air speed and direction of said aircraft.

5. An air speed indicating system for an aircraft having a rotating wing, comprising a device for determining variations in the air speed of said wing in its plane of rotation, and means controlled by said device according to the magnitude of said variations for operating an indicator according to the air speed of said aircraft in a direction parallel to the plane of rotation of said wing.

6. An air speed and direction indicating system for an aircraft having a rotating wing, comprising a device for determining variations in the air speed of said wing, an air speed indicator, means actuated by said device according to the magnitude of said variations for operating said air speed indicator, an air direction indicator, and means actuated by said device according to the phase of said variations relative to the revolution of said wing for operating said air direction indicator.

7. An air speed indicating system for an aircraft having a rotating wing, comprising a device for determining variations in the air speed of said wing in its plane of rotation, a signal generator responsive to said device for producing signals corresponding to said variations, an indicator and means actuated by said generator according to the magnitude of said signals for operating said indicator according to the air speed of said aircraft in a direction parallel to said plane of rotation.

8. An air speed and direction indicating system for an aircraft having a rotating wing, comprising a device for determining variations in the air speed of said wing in its plane of rotation, a generator responsive to said device for producing signals corresponding to said variations, an air speed indicator, means actuated by said generator according to the magnitude of said signals for operating said air speed indicator, an air direction indicator, and means actuated by said generator according to the phase of said signals relative to the revolution of said wing for operating said air direction indicator.

9. An air speed and direction indicating system for an aircraft having a rotating wing, comprising a device for determining variations in the air speed of said wing in its plane of rotation, a generator responsive to said device for producing signals corresponding to said variations, a generator for producing signals corresponding to the revolution of said wing, an air direction indicator, and means actuated by said signals according to the phase relation of said variations relative to the revolution of said wing.

10. An air speed and direction indicating system for an aircraft having a rotating wing, comprising a device for determining variations in the air speed of said wing, a generator responsive to said device for producing signals corresponding to said variations, an air speed indicator, means actuated by said signals according to the amplitude thereof for operating said air speed indicator, a second generator for producing signals having a predetermined phase relation with the rotation of said wing, an air direction indicator, and means including a phase comparator for determining the phase relation between the signals from said two generators for operating said air direction indicator.

11. An air speed indicating system for an aircraft having a wing rotating at a substantially constant angular speed, comprising a device for determining the air speed of said wing in its plane of rotation, means for segregating variable components from constant components of said air speed, and an air speed indicator actuated by said segregating means for measuring the amplitude of said variable components.

12. An air speed and direction indicating system for an aircraft having a wing rotating at a substantially constant angular speed, comprising a device for determining the air speed of said wing in its plane of rotation, means for segregating variable components from constant components of said air speed, an air speed indicator, means actuated by said segregating means according to the magnitude of said variable components for operating said air speed indicator, an air direction indicator, and means actuated by said segregating means according to the phase relation of said variable components to the revolution of said wing for operating said air direction indicator.

13. An air speed indicating system for an aircraft having a rotating wing, comprising a device for determining variations in the air speed of said wing in a direction perpendicular to the radial axis and contained in the plane of rotation thereof, an air speed indicator, and means actuated by said device according to the magnitude of said variations for operating said indicator to indicate the air speed of said aircraft in a direction parallel to said plane of rotation.

14. An air speed and direction indicating system for an aircraft having a rotating wing, comprising a device for determining variations in the air speed of said rotating wing in a direction perpendicular to the radial axis thereof, an air speed indicator, means actuated by said device according to the magnitude of said variations for operating said air speed indicator to indicate the air speed of said aircraft, an air direction indicator, and means adapted to compare the phase relation of said variations to the revolution of said wing for operating said air direction indicator to indicate the air direction of said aircraft.

15. An air speed indicating system for an aircraft having a rotating wing, comprising a device for measuring variations in the air speed of said wing along the radial axis thereof, an air speed indicator, and means actuated by said device according to said variations for operating said indicator to indicate the air speed of said aircraft.

16. An air speed and direction indicating system for an aircraft having a rotating wing, comprising a device for determining variations in the air speed of said rotating wing along a radial axis thereof, an air speed indicator, means actuated by said device according to said variations for operating said air speed indicator, an air direction indicator, and means actuated by said device for comparing the phase relation of said variations to the revolution of said wing for operating said air direction indicator.

17. An air speed indicating system for an aircraft having a rotating wing pivoted for oscillation about an axis angularly disposed with respect to its radial axis, comprising a device for determining the angular position of said wing about said pivot axis, an indicator, and means controlled by said device to operate said indicator.

18. An air speed indicating system for an aircraft having a rotating wing, comprising a device for determining the position of the axis of the cone generated by rotation of said wing, and means actuated by said device according to said position for indicating the air speed of said aircraft in a direction parallel to the base of said cone.

19. An air speed and direction indicating system for an aircraft having a rotating wing pivoted for oscillation about an axis angularly disposed with respect to its radial axis, comprising a device for determining the angular position of said wing about said pivot axis, an air speed indicator, means actuated by said device according to the amplitude of the movements of said wing about said pivot axis for operating said air speed indicator, an air direction indicator, and means actuated by said device for operating said air direction indicator in accordance with the phase relation of said pivotal movement to the revolution of said wing.

20. An air speed and direction indicating system for an aircraft having a rotating wing, comprising a device for determining the angular position of the axis of the cone generated by rotation of said wing, means actuated by said device according to the amplitude of said angular position for indicating the air speed of the aircraft, and means actuated by said device according to the direction of said angular position for indicating the air direction of said aircraft.

21. In an air speed and direction indicating system for an aircraft having a rotating wing and a device for determining variations in the air speed of said wing in its plane of rotation, an air speed and direction indicator comprising a pointer, and means actuated by said device for moving said pointer in a direction corresponding to the phase relation of said variations relative to the revolution of said wing and an amount corresponding to the magnitude of said variations.

22. In an air speed and direction indicating system for an aircraft having a rotating wing and a device for determining variations in the air speed of said wing in its plane of rotation, means actuated by said device for producing a magnetic field having a magnitude corresponding to the amplitude of said variations and a direction dependent upon the phase of said variations relative to the revolution of said wing, and a pointer deflected by said field according to its magnitude and direction to indicate the air speed and direction of said aircraft.

23. An air speed indicating device, as claimed in claim 13, in which the means operating the air speed indicator is substantially unresponsive to variations in the speed of rotation of the rotating wing.

24. An air speed measuring device for aircraft having a rotating wing comprising means adjacent the outer end of said wing for creating signals at all times proportional to the speed of the wing tip through the air in the plane of rotation of the wing, means responsive only to the amount of variation of such signals during each complete rotation of the wing, and an air speed indicator actuated from said last named means whereby said indicator is substantially unaffected by changes in the rotational speed of said wing.

25. An air speed measuring device for aircraft of the helicopter or rotating wing type, comprising a hot wire aneometer adjacent the outer end of at least one of the rotary wings and adapted to produce a variable signal proportional to its speed through the air in the plane of rotation of the wing, and means responsive to the changes in magnitude of said signal, said means being substantially non-responsive to changes of rotational speed of said wing.

WALDEMAR A. AYRES.
ROBERT L. WATHEN.
GEORGE H. LEE.

REFERENCES CITED

The following references are of record in the file of this patent:

UNITED STATES PATENTS

| Number | Name | Date |
| --- | --- | --- |
| 652,666 | Darlington | June 26, 1900 |
| 1,146,202 | Ogilvie | July 13, 1915 |
| 1,405,177 | Zahn | Jan. 31, 1922 |
| 2,125,365 | Waller | Aug. 2, 1938 |
| 2,127,847 | Schulte | Aug. 23, 1938 |
| 2,209,879 | Focke | July 30, 1940 |
| 2,243,458 | Esval et al. | May 27, 1941 |
| 2,343,383 | Martin et al. | Mar. 7, 1944 |
| 2,362,842 | Mueller | Nov. 14, 1944 |
| 2,380,108 | Holmes | July 10, 1945 |

FOREIGN PATENTS

| Number | Country | Date |
| --- | --- | --- |
| 372,204 | Great Britain | May 5, 1932 |